United States Patent
Hirose et al.

(10) Patent No.: US 6,823,681 B2
(45) Date of Patent: Nov. 30, 2004

(54) VEHICULAR AIR CONDITIONING CONTROL APPARATUS

(75) Inventors: Ryuichi Hirose, Tokyo (JP); Hiroyasu Nadamoto, Tokyo (JP); Kazuo Masuko, Tokyo (JP); Hajime Uchiyama, Shizuoka (JP)

(73) Assignees: Calsonic Kansei Corporation, Tokyo (JP); Suzuki Motor Corporation, Hamamatsu (JP)

( * ) Notice: Subject to any disclaimer, the term of this patent is extended or adjusted under 35 U.S.C. 154(b) by 60 days.

(21) Appl. No.: 10/439,333

(22) Filed: May 16, 2003

(65) Prior Publication Data

US 2003/0233839 A1 Dec. 25, 2003

(30) Foreign Application Priority Data

May 16, 2002 (JP) .................................... P2002-140935

(51) Int. Cl.[7] ............................ B60H 1/32; F25D 17/00
(52) U.S. Cl. ......................... 62/133; 62/181; 62/228.1; 62/236
(58) Field of Search ........................ 62/133, 134, 181, 62/183, 244, 236, 228.1

(56) References Cited

U.S. PATENT DOCUMENTS 5,490,556 A   2/1996  Pichotta

| | | | |
|---|---|---|---|
| 6,637,229 B1 * | 10/2003 | Forrest et al. ................ | 62/230 |
| 2001/0003904 A1 | 6/2001 | Hamery et al. | |
| 2002/0026801 A1 | 3/2002 | Yamashita | |
| 2004/0016246 A1 * | 1/2004 | Furukawa et al. ............ | 62/183 |

FOREIGN PATENT DOCUMENTS

| EP | 1 093 943 A2 | 4/2001 | |
| EP | 1 179 442 A2 | 2/2002 | |
| JP | 404140417 A * | 5/1992 | ............. F01P/7/04 |
| JP | 2000-274243 A | 10/2000 | |

* cited by examiner

*Primary Examiner*—Marc Norman
(74) *Attorney, Agent, or Firm*—Foley & Lardner LLP (57) ABSTRACT

In a vehicular air conditioning control apparatus having a compressor and an electric cooling fan of an externally controlled type, a fan motor control for increasing fan motor load is carried out in a compressor discharge capacity region lower than in normal control in below-listed cases.

(1) When a requested cooling performance is predicted to increase.

(2) When a vehicle is brought into an idling state.

(3) In cool down in which a requested cooling performance is predicted to increase to be equal to or larger than a set value, or when a vehicle is brought into an idling state.

12 Claims, 8 Drawing Sheets

FIG. 2

Pd: DELIVERY SIDE PRESSURE
Ps: INTAKE SIDE PRESSURE
Pc: CRANK CHAMBER PRESSURE

VEHICULAR AIR CONDITIONING CONTROL APPARATUS

The present disclosure relates to the subject matter contained in Japanese Patent Application No. 2002-140935 filed on May 16, 2002, which is incorporated herein by reference in its entirety.

BACKGROUND OF THE INVENTION

1. Field of the Invention

The present invention relates to a technical field of a vehicular air conditioning control apparatus adopting an electric cooling fan of an external (variable capacity) control type in an air conditioning cycle.

2. Description of the Related Art

Conventionally, there is known a vehicular air conditioning control apparatus, as such described in JP-A-2000-274243.

In the publication, with an object of achieving necessary minimum operation of a cooling fan over an entire operating region, there is described an apparatus for controlling an electric cooling fan arranged on the back side of a condenser and a radiator by constituting reference parameters by vehicle speed, engine cooling water temperature and compressor discharge pressure and selecting a control constant from a cooling fan operation map in an ON state of an air conditioner of operating a compressor.

However, in controlling the cooling fan of the conventional vehicular air conditioning control apparatus, the compressor discharge pressure is referred only with an object of acquiring information of an operating situation of the air conditioner. Therefore, when the cooling fan is controlled similarly under all of the vehicular conditions, there poses a problem that a deterioration in fuel efficiency is accelerated under specific vehicle conditions (in cooling down and in idling).

That is, in cooling down requesting a high cooling performance, when load of the cooling fan is restrained in consideration of technical thought of achieving the necessary minimum operation of the cooling fan as described in the object of the prior art, in order to meet the request of the high cooling performance, load of the compressor is increased to a high level by an amount of restraining the load of the cooling fan.

Further, in idling requesting to maintain the cooling performance, when the load of the cooing fan is restrained in consideration of the technical thought of achieving the necessary minimum operation of the cooling fan as described in the object of the prior art, in order to maintain the cooling performance, the load of the compressor is increased. Further, in the idling, a function of cooling a condenser by running wind becomes deficient.

As a result, both in the cooling down and the idling, by an increase in the load of the compressor in accordance with restraining the load of the cooling fan, a total load of the engine, further, the total load of a battery represented by a total sum of the load of the compressor and the load of the cooling fan is increased to accelerate the deterioration in the fuel efficiency depending on the magnitude of the loads.

SUMMARY OF THE INVENTION

The invention has been carried out by paying attention to the above-described problem and it is an object thereof to provide a vehicular air conditioning control apparatus capable of achieving to improve fuel efficiency while ensuring a requested cooling performance in cooling down or idling.

In order to achieve the above-described object, according to one aspect of the invention, in a vehicular air conditioning control apparatus having a compressor and an electric cooling fan of an external (variable capacity) control type, a fan motor is controlled to increase load of the fan motor in a region of a delivery capacity of a compressor lower than that in normal control in any of below-listed cases.

(1) When it is predicted that a requested cooling performance is increased.
(2) When a vehicle is brought into an idling state.
(3) In cooling down when it is predicted that a requested cooling performance is increased to be equal to or higher than a predetermined value, or, when a vehicle is brought into an idling state.

Here, the normal control signifies a control of providing a load of a fan motor in accordance with a delivery capacity of a compressor to achieve better fuel efficiency in normal running in which running wind is introduced into a condenser and a requested cooling performance is not changed or changed by a small amount.

According to the vehicular air condition control apparatus of the invention, in cooling down or in idling, there is carried out cooperative operation in which in accordance with an increase in a load of a fan motor in a region of a low delivery capacity of a compressor with excellent response, an increase in the delivery capacity of the compressor is restrained to be low. As a result, while ensuring the requested cooling performance, a total engine load represented by a total sum of the load of the compressor and the load of the cooling fan is restrained to be low and an improvement in fuel efficiency depending on the total engine load can be achieved.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE PREFERRED EMBODIMENTS

Referring now to the accompanying drawings, there is shown a preferred embodiment of the invention.

An explanation will be given of an embodiment realizing the vehicular air conditioning control apparatus of the invention based on an embodiment in correspondence with the invention according to claims 1, 2, 3, 4, 5, 6 and 7.
(Preferred Embodiment)

First, a structure of the preferred embodiment will be explained.

Figure 1:
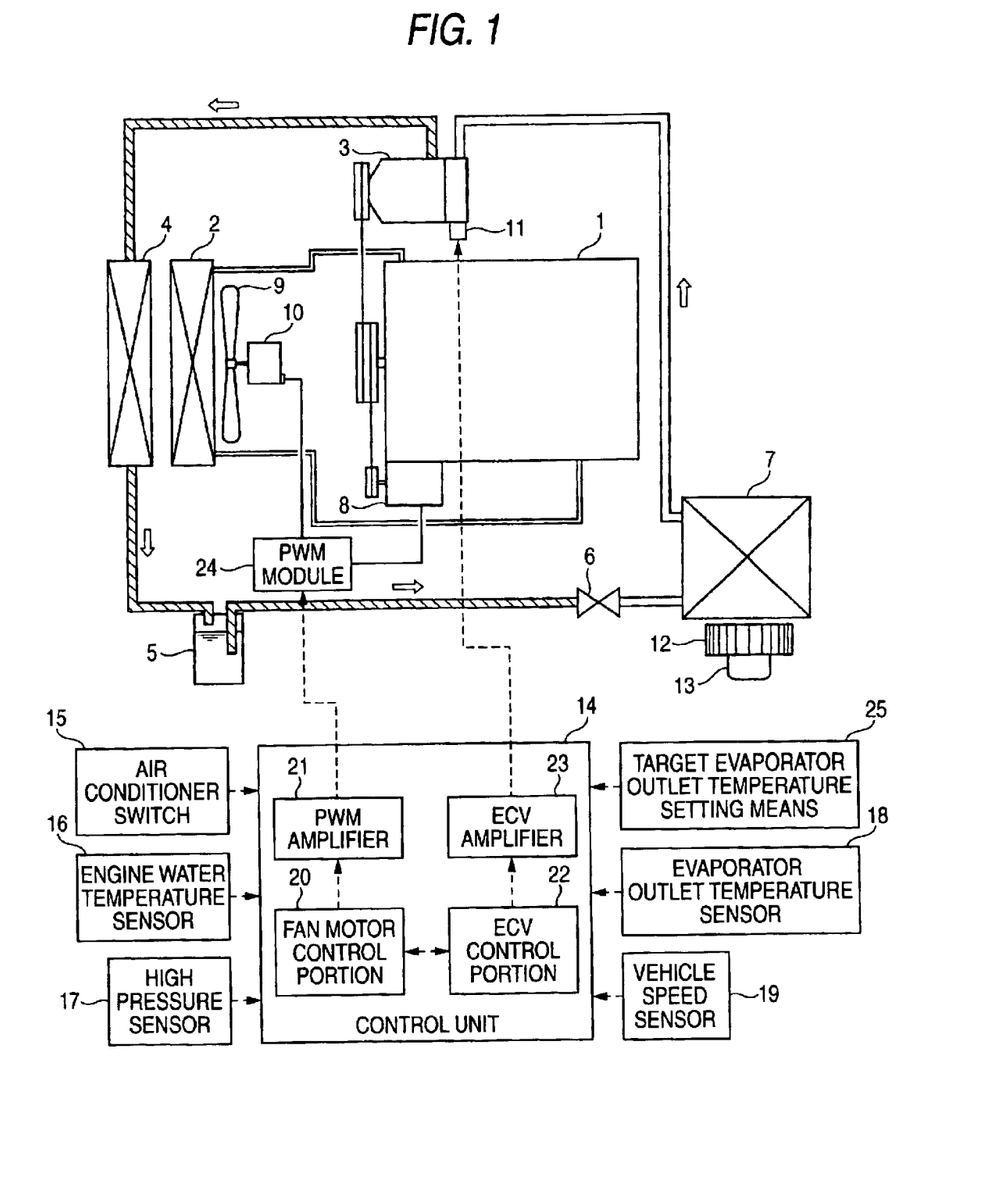
FIG. 1 is a total system view showing a vehicular air conditioning control apparatus according to an embodiment.

FIG. 1 is a total system view showing a vehicular air conditioning control apparatus according to the embodiment. In FIG. 1, numeral 1 designates an engine, numeral 2 designates a radiator, numeral 3 designates an external (variable capacity) control type compressor (compressor), numeral 4 designates a condenser, numeral 5 designates a liquid tank, numeral 6 designates a thermostatic expansion valve, numeral 7 designates an evaporator, numeral 8 designates an alternator, numeral 9 designates an electric cooling fan, numeral 10 designates a fan motor, numeral 11 designates a control valve, numeral 12 designates a blower fan and numeral 13 designates a blower fan motor.

The engine 1 and the radiator 2 are connected by an engine cooling water inlet pipe and an engine cooling water outlet pipe.

An air conditioning cycle in the apparatus of the embodiment is constituted by the external control type compressor 3, the condenser 4, the liquid tank 5, the thermostatic expansion valve 6 and the evaporator 7. The respective constituent elements will be explained as follows.

The external control type compressor 3 is driven by the engine 1 to convert a refrigerant comprising a gas at low temperature and low pressure delivered from the evaporator 7 into a gas at high pressure and high temperature to deliver to the condenser 4. A compressor discharge capacity of the external control type compressor 3 is controlled variably by a duty signal inputted to the control valve 11. Further, a detailed constitution of the external control type compressor 3 will be described later.

The condenser 4 is arranged on the front side of the radiator 2 to cool the refrigerant at high pressure and high temperature to a condensing point by running wind or wind provided by the electric cooling fan 9 to convert into a liquid at high pressure and medium temperature to deliver to the liquid tank 5.

The liquid tank 5 removes moisture and dust and dirt included in the refrigerant by the liquid at high pressure and medium temperature delivered from the condenser 4 and stores the refrigerant to be able to supply smoothly and delivers the refrigerant to the thermostatic expansion valve 6.

The thermostatic expansion valve 6 expands the refrigerant comprising the liquid at high pressure and medium temperature delivered from the liquid type 5 rapidly into a liquid (mist-like form) at low temperature and low pressure to deliver to the evaporator 7.

The evaporator 7 converts the mist-like refrigerant delivered from the thermostatic expansion valve 6 into a gas at low pressure and low temperature by evaporating the refrigerant while absorbing heat from air at inside of a vehicular compartment delivered by the blower fan 12 and delivers the refrigerant comprising the gas at low pressure and low temperature to the external control type compressor 3.

The electric cooling fan 9 includes the fan motor 10 operated by constituting a power source by terminal voltage of the alternator 8 driven by the engine 1. Motor drive voltage of the fan motor 10 is subjected to PWM control and the condenser cooling capacity by operating the fan motor 10 is variably controlled.

In addition, PWM (abbreviation of Pulse Width Modulation) refers to a pulse width modulation system in which a time width of a pulse having constant amplitude and a constant repeating period is changed in accordance with a waveform of a signal wave.

The blower fan 12 is driven by the blower fan motor 13 to suck inner air, which is air at inside of the vehicular compartment, pressurize the air to the evaporator 7 and deliver cooled air into the vehicular compartment.

Next, an electronic control system will be explained. In FIG. 1, numeral 14 designates a control unit, numeral 15 designates an air conditioner switch, numeral 16 designates an engine water temperature sensor, numeral 17 designates a high pressure sensor (section for detecting a value equivalent to a discharge capacity of the compressor), numeral 18 designates an evaporator outlet temperature sensor (evaporator outlet temperature detecting section), numeral 19 designates a vehicle speed sensor (vehicle speed detecting section), numeral 20 designates a fan motor control portion, numeral 21 designates a PWM amplifier, numeral 22 designates an ECV control portion (compressor controlling section), numeral 23 designates an ECV amplifier, numeral 24 designates a PWM module and numeral 25 designates target evaporator outlet temperature setting section.

The control unit 14 is inputted with a switch signal from the air conditioner switch 15, engine cooling water temperature information from the engine water temperature sensor 16, compressor discharge capacity information from the high pressure sensor 17 provided at a middle of a pipe on an outlet side of the liquid tank 5, evaporator outlet temperature information from the evaporator outlet temperature sensor 18, target evaporator outlet temperature setting information from the target evaporator outlet temperature setting means 25 and vehicle speed information from the vehicle speed sensor 19.

Here, the evaporator outlet temperature sensor 18 is provided directly at an outlet of the evaporator 7. Further, a sensor value from the high pressure sensor 17 is used for controlling the fan motor as a value representing compressor discharge side pressure Pd. Further, the control unit 14 is inputted, other than the above-described information, with necessary information such as temperature control dial information, inner air sensor information, outer air sensor information, solar radiation sensor information, intake temperature sensor information, mode switch information, and blower fan airflow information.

The control unit 14 includes the fan motor control portion 20 for calculating a duty ratio outputted to the fan motor 10, the PWM amplifier 21 for outputting a duty signal to the PWM module 24 in accordance with a result of calculation at the fan motor control portion 20, the ECV control portion 22 for calculating a duty ratio outputted to the control valve 11, and the ECV amplifier 23 for outputting a duty signal to the control valve 11 in accordance with a result of calculation of the ECV control portion 22.

The PWM module 24 is connected to a terminal of the alternator 8 and produce drive voltage by the PWM duty ratio applied to the fan motor 10 by receiving the duty signal from the PWM amplifier 21.

Figure 2:
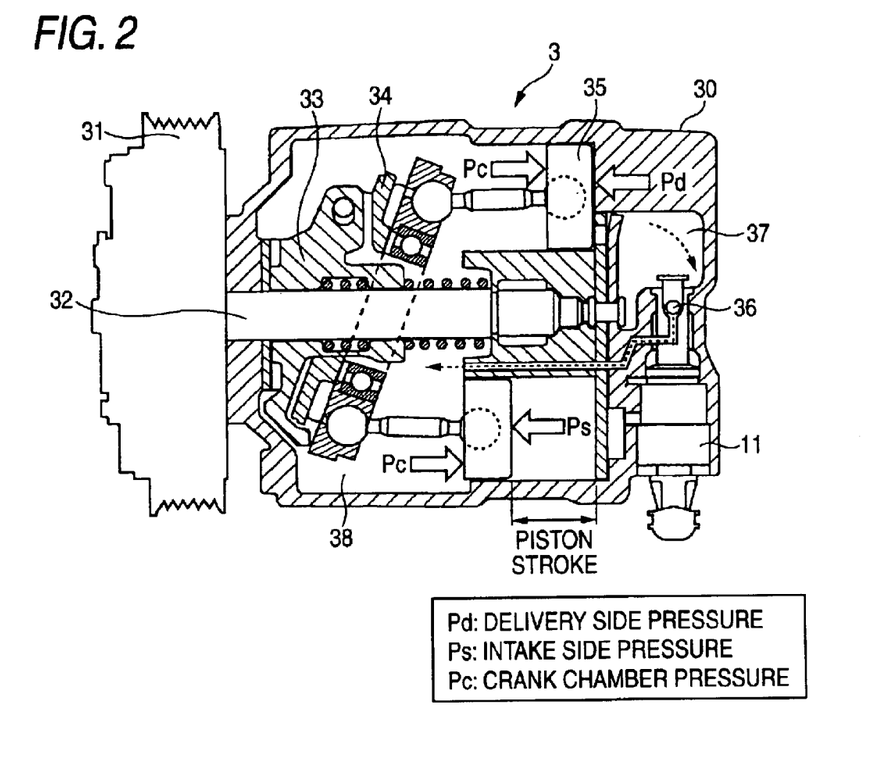
FIG. 2 is a sectional view showing an external control type compressor applied to the vehicular air conditioning control apparatus according to the embodiment.
Figure 3:
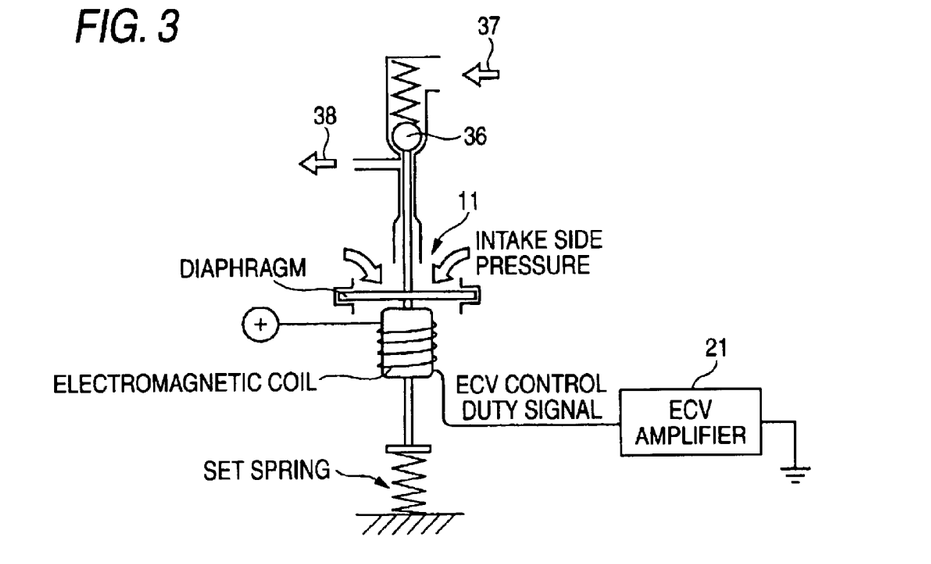
FIG. 3 is an explanatory view of the operation of variable capacity control of external control type compressor applied to the vehicular air conditioner control apparatus according to the embodiment.

FIG. 2 is a sectional view showing the external control type compressor 3 and FIG. 3 is an explanatory view of control operation of the compressor discharge capacity (discharge side pressure) by the duty signal to the control valve 11 of the external control type compressor 3.

The external control type compressor 3 is of a multi-cylinder swash plate type and constituted by including a compressor case 30, a pulley 31, a drive shaft 32, a swash plate driving member 33, a swash plate 34, pistons 35, a high pressure ball valve 36, the control valve 11, a high pressure chamber 37 and a crank chamber 38.

The external control type compressor 3 controls a delivery capacity by changing inclination of the included swash plate 34. That is, by the duty signal inputted to the control valve 11 integrated into the external control type compressor 3, a lift amount of the high pressure ball valve 36 is changed. Thereby, the external control type compressor 3 controls a flow rate of the refrigerant flowing from the high pressure chamber 37 (having discharge side pressure Pd) to the crank chamber 38 by way of the high pressure ball valve 36, changing the pressure of the crank chamber 38 at inside of the compressor 3 (crank chamber pressure Pc), and changing the inclination of the swash plate 34.

As shown in FIG. 3, the lift amount of the high pressure ball valve 36 is determined by a balance between low pressure applied to a diaphragm of the control valve 11 (intake side pressure Ps) and spring load of a set spring and magnetic force generated at an electromagnetic coil.

A pulse ON-OFF signal (duty signal) at predetermined frequency, 400 Hz for example, is transmitted from the ECV amplifier 21 to the electromagnetic coil at inside of the control valve 11 and the lift amount of the high pressure ball valve 36 is controlled by a change in the magnetic force generated by effective current by the duty ratio.

Next, the operation of the embodiment will be explained.

[Fan Motor Control Processing]

Figure 4:
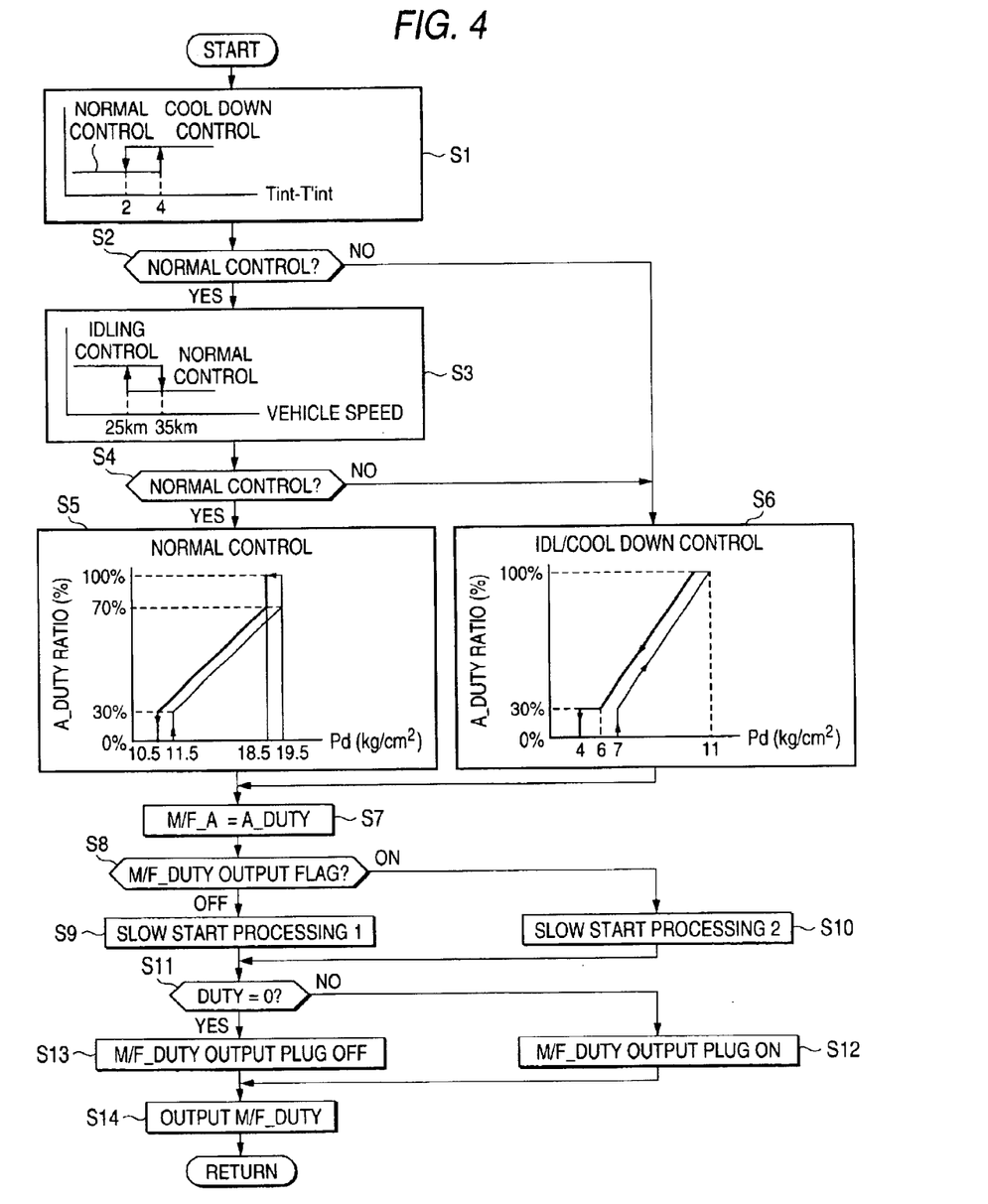
FIG. 4 is a flowchart showing a flow of fan motor control processing executed at a fan motor control portion of a control unit in the vehicular air conditioning control apparatus according to the embodiment.

FIG. 4 is a flowchart showing a flow of fan motor control processing executed at the fan motor control portion 20 of the control unit 14 and an explanation will be given of respective steps as follows.

At step S1, temperature difference ΔT between the evaporator outlet temperature Tint and target evaporator outlet temperature T'int is calculated (requested cooling performance predicting means). Further, normal control is set until the magnitude of the calculated temperature difference ΔT (=Tint−T'int) becomes 4° C. and when the magnitude of the calculated temperature difference ΔT becomes equal to or higher than 4° C., setting of normal control is switched to setting of cool down control. Further, when the magnitude of the temperature difference ΔT calculated in cool down control becomes equal to or lower than 2° C., setting of cool down control is switched to setting of normal control.

Here, at the ECV control portion 22 (target evaporator outlet temperature setting section) of the control unit 14, the compressor is controlled to provide a target compressor discharge capacity calculated in accordance with outside temperature, compartment temperature, target blow wind temperature and the like and the target evaporator outlet port temperature T'int is calculated at a middle stage of the calculating operation. Further, the target evaporator outlet temperature T'int is inputted from the ECV control portion 22 to the fan motor control portion 20 via a bidirectional communication line.

At step S2, it is determined whether normal control is set at step S1, when normal control is set, the operation proceeds to step S3 and when the cool down control is set, the operation proceeds to step S6.

At step S3, idling control is set until the vehicle speed V becomes 35 km/h and when the vehicle speed V becomes equal to or faster than 35 km/h, setting of idling control is switched to setting of normal control. Further, when the vehicle speed V becomes equal to or slower than 25 km/h in normal control, setting of normal control is switched to setting of idling control.

At step S4, it is determined whether normal control is set at step S3, when normal control is set, the operation proceeds to step S5 and when idling control is set, the operation proceeds to step S6.

At step S5, by using a normal control map and the compressor discharge side pressure Pd described in the frame, a duty ratio A_DUTY for the fan motor 10 is calculated.

Here, according to the normal control map, at a region of Pd<10.5 kg/cm$^2$, A_DUTY=0%, at a region of Pd>19.5 kg/cm$^2$, A_DUTY=100% and at a region of 10.5 kg/cm$^2$≦Pd≦19.5 kg/cm$^2$, the duty ratio A_DUTY is proportionally changed from 0% to 100% while providing hysteresis to increase and reduction.

Further, as the compressor discharge side pressure Pd, there is used a compressor discharge side pressure recognized value based on a pressure sensor value from the high pressure sensor 17 corrected such that a change in the pressure sensor value becomes gradual.

At step S6, the duty ratio A_DUTY for the fan motor 10 is calculated by using an idling/cool down control map and the compressor discharge side pressure Pd described in the frame.

Here, according to the idling/cool down control map, at a region of Pd<4.0 kg/cm$^2$, A_DUTY=0%, at a region of Pd>11.0 kg/cm$^2$, A_DUTY=100% and at a region of 4.0 kg/cm$^2$≦Pd≦11.0 kg/cm$^2$, the duty ratio A_DUTY is proportionally changed from 0% to 100% while providing hysteresis to increase and reduction.

Figure 6:
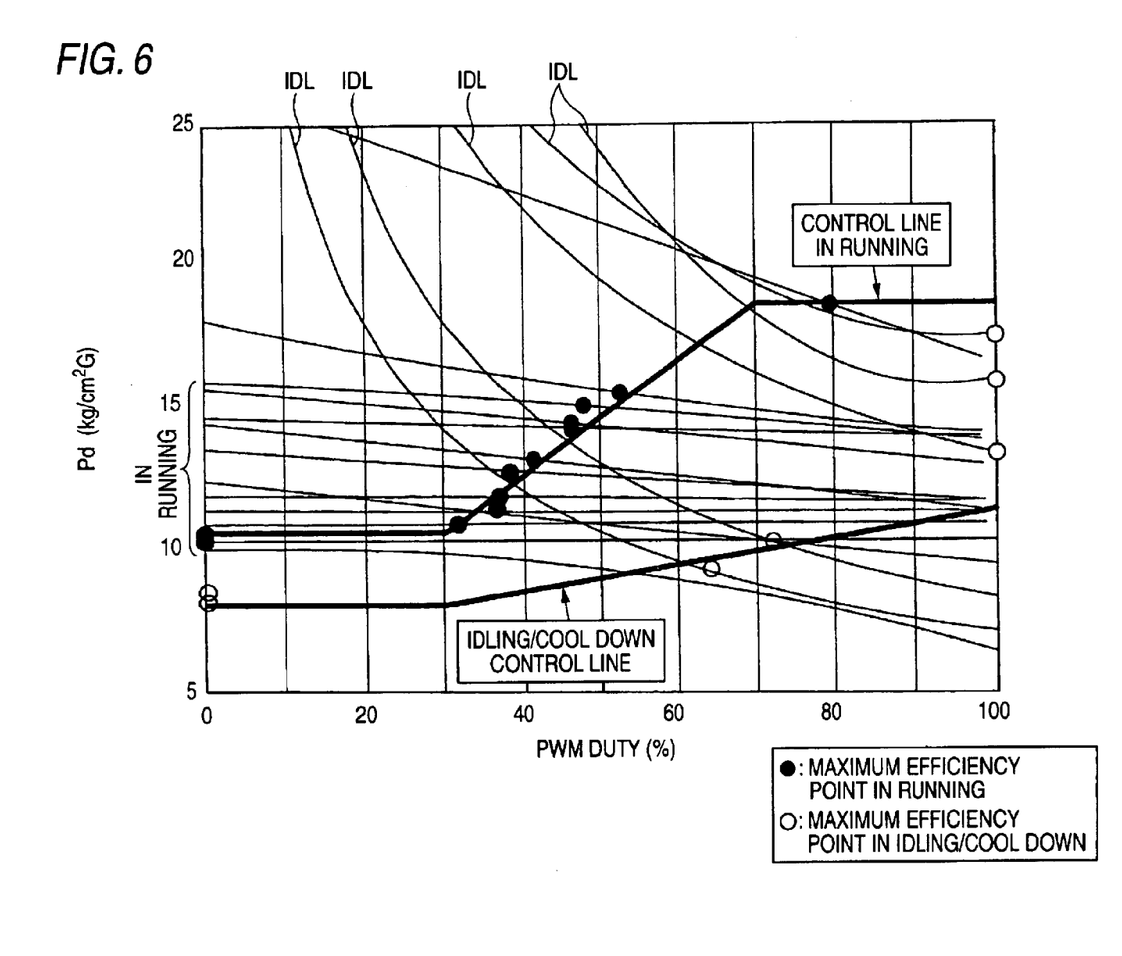
FIG. 6 is a diagram showing a control line in running and an idling/cool down control line when the ordinate is set to a compressor discharge side pressure and the abscissa is set to a PWM duty for a fan motor.

Further, the normal control map is configured based on a control line in running of FIG. 6 and the idling/cool down control map is configured based on an idling/cool down control line of FIG. 6.

At step S7, a fan motor duty ratio M/F_A is constituted by the duty ratio A_DUTY calculated at the step S5 or S6 and the operation proceeds to next step S8.

At step S8, a duty ratio signal by the fan motor duty ratio M/F_A at step S7 is outputted from the PWM amplifier 21 to the PWM module 24.

In the flowchart, a series of operation from step S1 through step S7 by way of steps S2 and S6 corresponds to an operation of first fan motor controlling section of claim 1. Further, a series of operation from step S1 through step S7 by way of steps S2, S3, S4 and S6 corresponds to an operation of second fan motor controlling section of claim 3. Further, a series of operation from step S1 through step S7 corresponds to an operation of third fan motor controlling section of claim 5.

[Setting of Control Map]

First, when an electric fan is adopted as the cooling fan of the condenser, load torque applied to the engine (hereinafter, referred to as total engine load) is provided by a total sum of power load torque for driving the compressor (hereinafter, referred to as compressor power load) and power load torque for driving the alternator of the electric cooling fan (hereinafter, referred to as electric cooling fan load).

Hence, an experiment has been carried out to clarify what relationship is constituted by a relationship among the compressor power load, the electric cooling fan load and the engine load constituted by summing up the two loads when the external control type compressor 3 and the external control type electric cooling fan 9 are adopted in the air conditioning system as in the embodiment. A result of the experiment is shown in FIG. 5.

Figure 5:
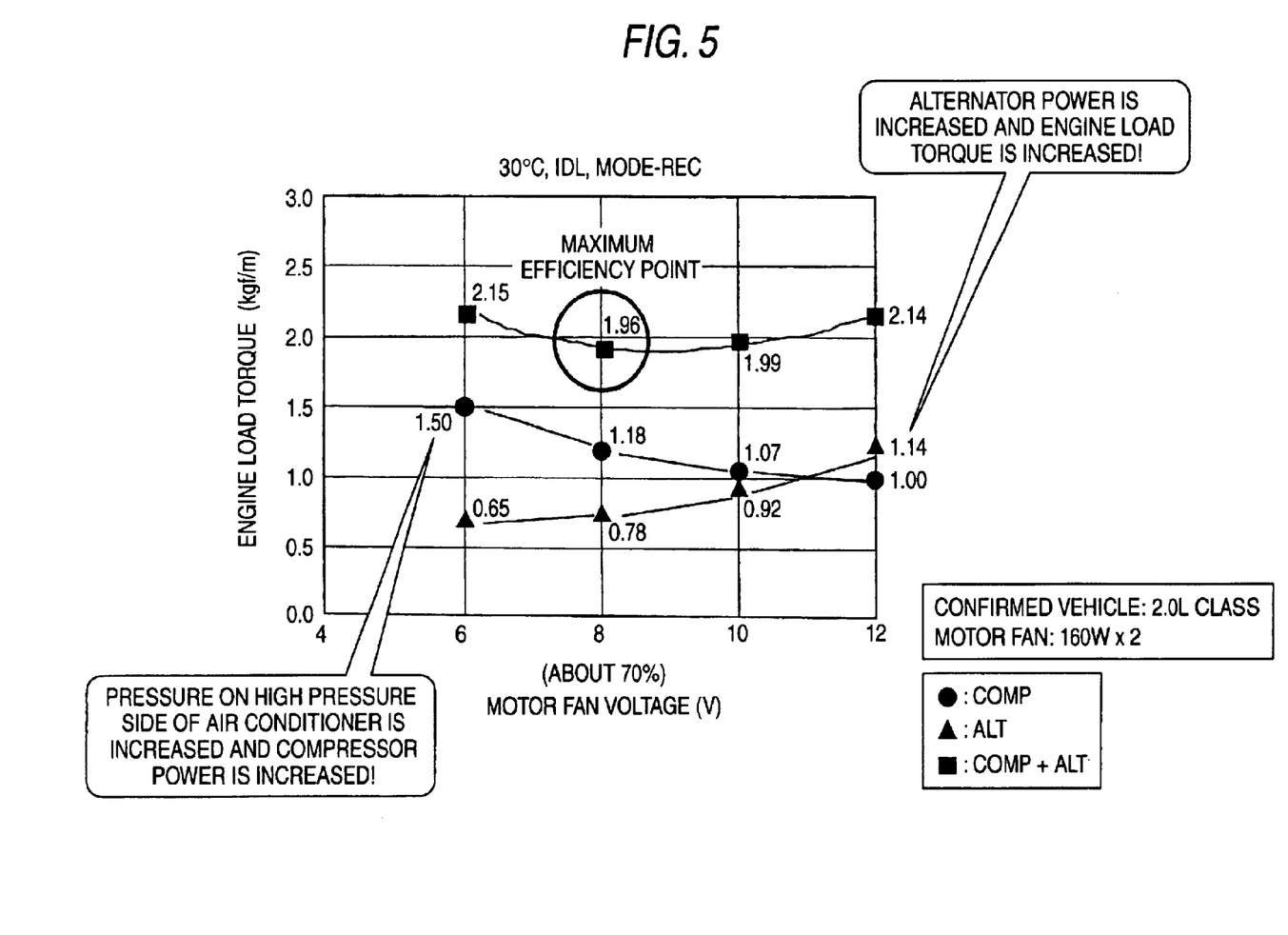
FIG. 5 is a diagram of a result of an experiment showing an engine load torque characteristic by an alternator measured while maintaining a cooling performance, an engine load torque characteristic by a compressor and a total engine load torque characteristic constituted by summing up the two load torques.

According to the experiment, while preventing the cooling performance from being changed, the engine load torque by the alternator (electric cooling fan load) and the engine load torque by the compressor (compressor power load) are measured, as is apparent from two engine load torque characteristics of FIG. 5, there is established a relationship in which when the engine load torque by the compressor is increased, the engine load torque by the alternator is reduced, conversely, when the engine load torque by the alternator is increased, the engine load torque by the compressor is reduced.

Further, when the total engine load torque constituted by summing up the two load torques is observed from the result of experiment of FIG. 5, when the motor fan voltage is 6V, the total engine load is 2.15 kgf·m, when the motor fan voltage is 8V, the total engine load torque is 1.96 kgf·m, when the motor fan voltage is 10V, the total engine load torque is 1.99 kgf·m, when the motor fan voltage is 12V, the total engine load torque is 2.14 kgf·m and when the motor fan voltage is 8V, a highest efficiency point minimizing the total engine load torque emerges.

Therefore, it has been clarified by the experiment of FIG. 5 that there is shown the relationship in which when the compressor power load is increased, the electric cooling fan load is reduced, conversely, when the electric cooling fan load is increased, the compressor power load is reduced, further, the total engine load is not necessarily reduced by restraining either one load of the cooling fan electric load and the compressor power load to be low.

The clarified result shows a cooperative relationship that when the electric load of the fan motor on one side is controlled, the power load of the compressor on other side is changed, further, signifies that the compressor and the fan motor can be operated by the highest efficiency point minimizing the total engine load torque by optimizing electric load control of the fan motor.

Hence, as shown in FIG. 6, the inventors have measured a plurality of highest efficiency points (highest fuel efficiency points) while changing the PWM duty ratio with respect to the fan motor and the discharge side pressure Pd of the compressor respectively in idling, in running at 40 km/h, in running at 60 km/h and in running at 80 km/h.

Further, as shown in FIG. 6, in consideration of the highest efficiency points calculated by the above-described measuring operation, the cooling performance of the air conditioning system and the like, an inclination of a control line in running and an inclination in an idling/cool down control line are determined to thereby set the control line in running and the idling/cool down control line.

Successively, based on the control line in running of FIG. 6, the normal control map shown in the frame is set at step S5 of FIG. 4 and based on the idling/cool down control line of FIG. 6, the idling/cool down control map shown in the frame is set at step S6 of FIG. 4.

[Fan Motor Control Operation in Starting]

When the air conditioner switch is turned on in the case in which the vehicle is stationary before starting by starting the engine 1, the evaporator outlet temperature Tint is high, the temperature difference ΔT between the evaporator outlet temperature Tint and the target evaporator outlet temperature Tint exceeds 4° C. and therefore, in the flowchart of FIG. 4, there is constituted a flow proceeding from step S1 through step S7 by way of steps S2 and S6, and the cool down control is started by selecting the idling/cool down control map.

Figure 7:
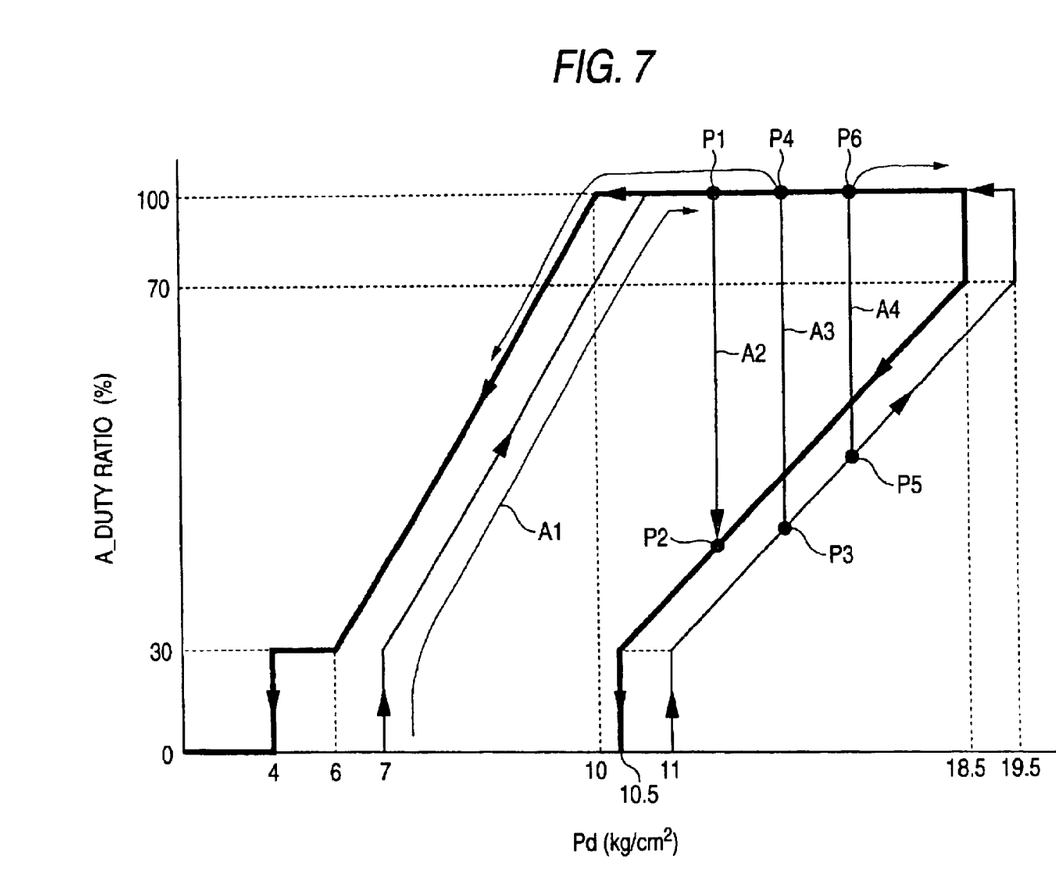
FIG. 7 is a diagram showing a normal control map and an idling/cool down control map by the same coordinate axes for explaining operation of various vehicle states.

That is, as shown by arrow A1 in FIG. 7, when the compressor discharge side pressure Pd becomes 7.2 kg/cm², the duty ratio for the fan motor 10 is increased up to 30% and the duty ratio for the fan motor 10 is increased up to 100% in proportion to an increase in the compressor discharge side pressure Pd until the compressor discharge side pressure Pd becomes 11.0 kg/cm².

Further, when the evaporator delivery temperature Tint is lowered by the cooling effect and the temperature difference ΔT becomes equal to or lower than 2° C., the cool down control is released.

However, in the case in which the vehicle speed is smaller than 35 km/h even when the vehicle is started, in the flowchart of FIG. 4, there is constituted a flow proceeding from step S1 through step 7 by way of steps S2, S3, S4 and S6 to be brought into idling control, however, both in cool down and in idling, the same idling/cool down control map is used and as a result, the same control is maintained.

As described above, in cool down and idling by starting to operate the air conditioner, when the compressor discharge side pressure Pd becomes a value at a low level (7.0 kg/cm²), the fan motor 10 starts operating, further, when the compressor discharge side pressure Pd reaches a normal starting region (11.0 kg/cm²), the duty ratio for the fan motor 10 is made to be 100% already, by increasing the fan motor electric load at an early stage, an increase in the compressor power load is restrained, as a result, improvement of high fuel efficiency is achieved.

That is, in cool down or in idling by starting to operate the air conditioner, when the fan motor 10 is assumedly operated to restrain, although the fan motor electric load is reduced, the compressor power load is increased by the cooperative operation and improvement of fuel efficiency is not achieved.

In addition thereto, in order to ensure the requested cooling performance while cooling of the condenser 4 by running wind is not achieved and it is necessary to blow wind from the electric cooling fan 9.

[Fan Motor Control Operation in Running]

When the vehicle speed is increased after starting and the vehicle speed becomes equal to or faster than 35 km/h, in the flowchart of FIG. 4, there is constituted a flow proceeding from step S1 through step S7 by way of steps S2, S3, S4 and S5, and the normal control is started by selecting the normal control map.

That is, as shown by arrow A2 in FIG. 7, when an operation point at which the vehicle speed becomes 35 km/h is designated by notation P1, the duty ratio for the fan motor 10 is reduced in one motion to an operation point P2 and thereafter, a control of changing the duty ratio for the fan motor 10 along the normal control map is carried out in accordance with a reduction or an increase in the compressor discharge side pressure Pd.

As described above, in running at the vehicle speed 35 km/h or faster, since cooling of the condenser 4 by running wind is achieved, even when the fan motor electric load is restrained, the requested cooling performance can be ensured, further, by restraining the fan motor electric load, even when the compressor power load is more or less increased, the total engine load is restrained to be low by the fan motor control along the normal control map. Therefore, improvement of high fuel efficiency is achieved as aimed by the normal control map.

[Fan Motor Control Operation in Stopping Vehicle]

For example, in the case in which the vehicle is decelerated to stop from running at the vehicle speed of 35 km/h or faster as in stopping the vehicle at a traffic signal, when the vehicle speed becomes equal to or slower than 25 km/h, in the flowchart of FIG. 4, there is constituted a flow proceeding from step S1 through step S7 by way of steps S2, S3, S4 and S6, and idling control is started by selecting the idling/cool down control map.

That is, as shown by arrow A3 in FIG. 7, when an operation point at which the vehicle speed becomes equal to or slower than 25 km/h is designated by notation P3, the operation point is increased in one motion to P4 and the duty ratio for the fan motor 10 is set to 100%. Thereafter, when the compressor discharge side pressure Pd is reduced, until the compressor discharge side pressure Pd becomes 10.0 $kg/cm^2$, the duty ratio for the fan motor 10 of 100% is maintained. Thereafter, when the compressor discharge side pressure Pd becomes equal to or lower than 10.0 $kg/cm^2$, in accordance with the reduction, there is carried out a control of reducing the duty ratio for the fan motor 10 along the idling/cool down control map.

As described above, in shifting from a running state to a stationary state, the compressor power load is reduced by setting the duty ratio of the fan motor 10 in one motion to 100% and changing the fan motor electric load to be a maximum value with excellent response. Therefore, while ensuring the requested cooling performance in accordance with an increase in the condenser cooling performance by the fan, by reducing the compressor power load, improvement of high fuel efficiency is achieved as aimed by the idling/cool down control map.

[Cool Down Control Operation in Midst of Running]

When the temperature difference between the evaporator outlet temperature Tint and the target evaporator outlet temperature T'int exceeds 4° C. in the case in which a window is opened in the midst of running (driving), outside air at high temperature flows into the vehicular compartment and the evaporator outlet port temperature Tint rises, in the case in which the set temperature is considerably lowered by operating the temperature control dial in the midst of running or the like, in the flowchart of FIG. 4, there is constituted a flow proceeding from step S1 through step S7 by way of steps S2 and S6, and cool down control is started by selecting the idling/cool down control map.

That is, as shown by arrow A4 in FIG. 7, when an operation point at which normal control is shifted to cool down control is designated by notation P5, the operation point rises in one motion to P6 and the duty ratio for the fan motor 10 becomes 100%. Thereafter, even when the compressor discharge side pressure Pd is increased by an increase in the requested cooling performance, a control of maintaining the duty ratio for the fan motor 10 to 100% is carried out along the idling/cool down control map.

As described above, in cool down control in the midst of running by changing the duty ratio for the fan motor 10 in one motion to 100% and changing the fan motor electric load to be a maximum value with excellent response, the high condenser cooling performance is achieved by the fan and running wind. Therefore, by restraining an increase in the compressor power load in accordance with the high condenser cooling performance, improvement of high fuel efficiency is achieved as aimed by the idling/cool down control map.

[Fuel Efficiency Comparison]

The inventors have carried out a test of comparing fuel efficiency by an air conditioning system A having a fixed compressor operated in cooperation with ON/OFF of an air conditioner, an air conditioning system B for subjecting a fan motor of an external control type to a single control (independent control not in consideration of fuel efficiency) in contrast to a variable capacity compressor of external control type, and an air conditioning system C of the first embodiment for subjecting a fan motor of an external control type to a composite control (cooperative control in consideration of fuel efficiency) in contrast to a variable capacity compressor of an external control type.

Figure 8:
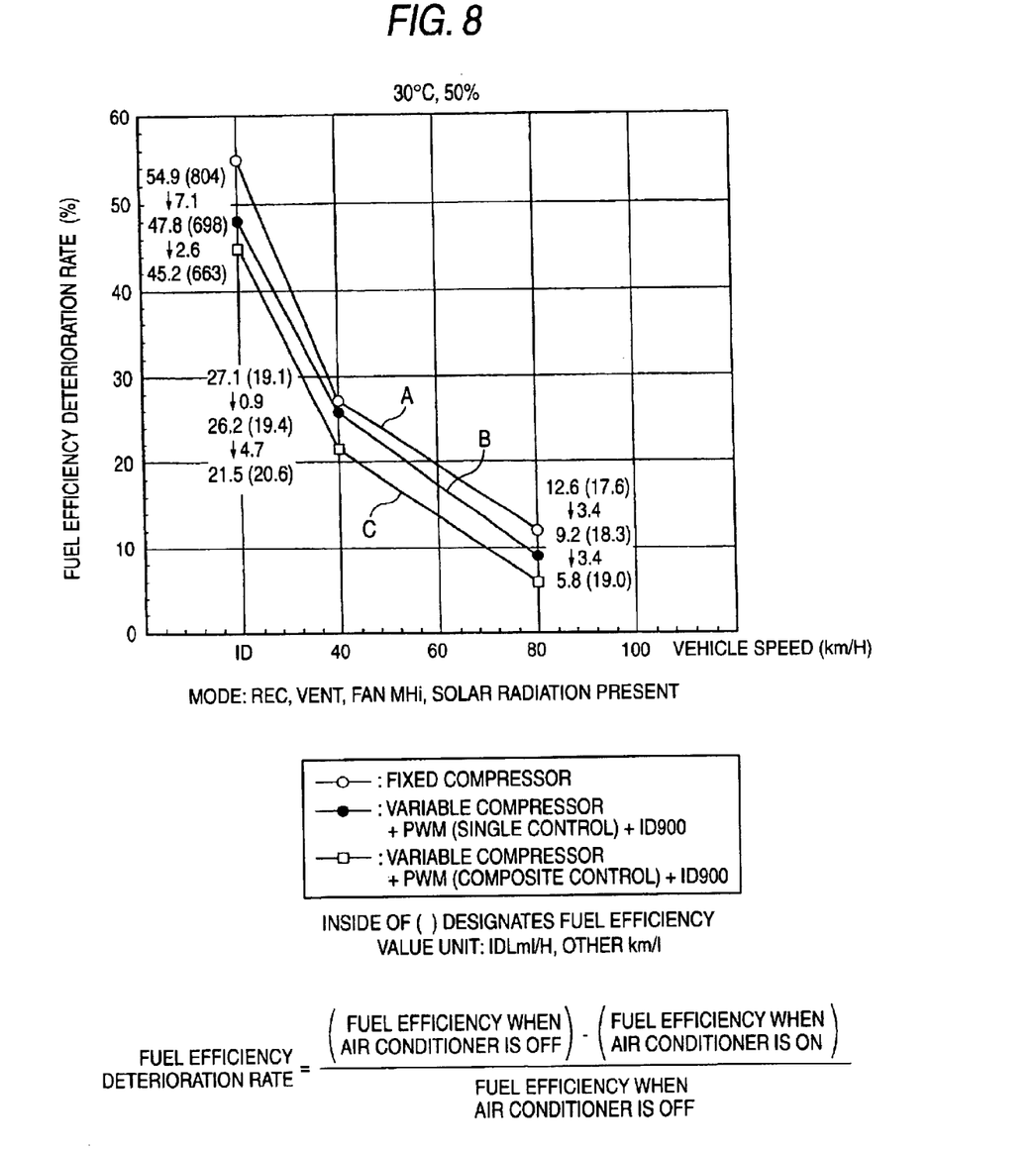
FIG. 8 is a diagram of a result of a fuel efficiency comparison test 1 carried out to confirm an effect of improving fuel efficiency by a fan motor control according to the embodiment.

As a result of the fuel efficiency comparing test at 30° C., 50% shown in FIG. 8, in idling at 900 rpm, the fuel efficiency deterioration rate is 54.9% for the system A, 47.8% for the system B and 45.2% for the system C. And the rate is reduced by 7.1% by changing from the system A to the system B and the rate is reduced by 2.6% by changing from the system B to the system C. In running at 40 km/h, the fuel efficiency deterioration rate is 27.1% for the system A, 26.2% for the system B and 21.5% for the system C. And the rate is reduced by 0.9% by changing from the system A to the system B and the rate is reduced by 4.7% by changing from the system B to the system C. In running at 80 km/h, the fuel efficiency deterioration rate is 12.6% for the system A, 9.2% for the system B and 5.8% for the system C. And the rate is reduced by 3.4% by changing from the system A to the system B and the rate is reduced by 3.4% by changing from the system B to the system C.

Figure 9:
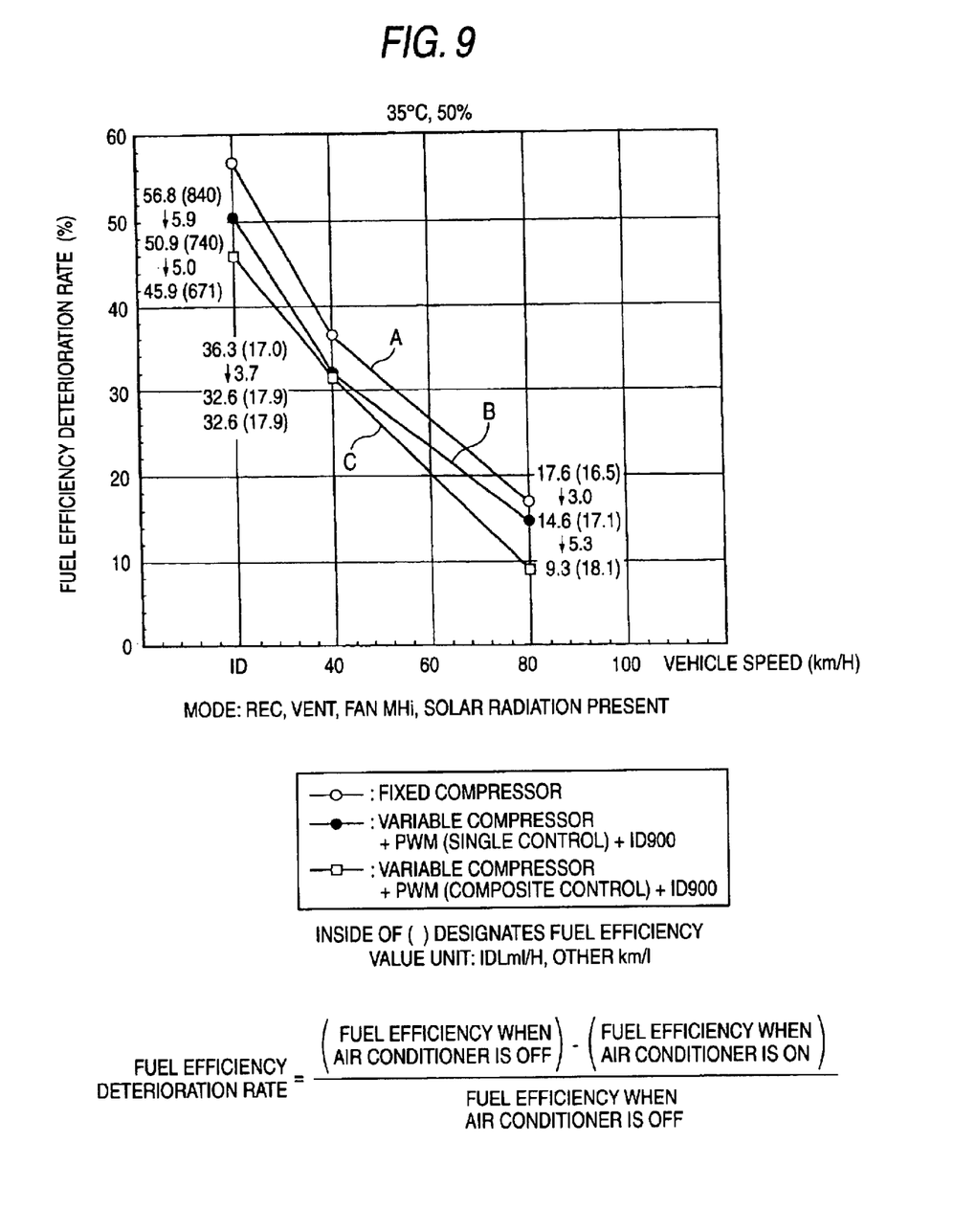
FIG. 9 is a diagram of a result of a fuel efficiency comparison test 2 carried out to confirm the effect of improving the fuel efficiency by the fan motor control according to the embodiment.

As a result of the fuel efficiency comparing test at 35° C., 50% shown in FIG. 9, in idling at 900 rpm, the fuel efficiency deterioration rate is 56.8% for the system A, 50.9% for the system B and 45.9% for the system C. And the rate is reduced by 5.9% by changing from the system A to the system B and the rate is reduced by 5.0% by changing from the system B to the system C. In running at 40 km/h, the fuel efficiency deterioration rate is 36.3% for the system A, 32.6% for the system B and 32.6% for the system C. And the rate is lowered by 3.7% by changing from the system A to the system B and a difference of the rate stays to be 0% by changing from the system B to the system C. In running at 80 km/h, the fuel efficiency deterioration rate is 17.6% for the system A, 14.6% for the system B and 9.3% for the system C. And the rate is reduced by 3.0% by changing from the system A to the system B and the rate is reduced by 5.3% by changing from the system B to the system C.

As described above, an effect of improving fuel efficiency in the case of comparing the air conditioning system C of the embodiment with the air conditioning system A is as follows.

(a) In idling, the fuel efficiency deterioration ratio reduced by changing the system A to the system C in the experiments are 9.7% and 10.9%, and improvement of fuel efficiency of around 10% has been confirmed.

(b) In running at 40 km/h, the fuel efficiency deterioration ratio reduced by changing the system A to the system C in the experiments are 5.6% and 3.7%, and improvement of fuel efficiency of around 5% has been confirmed.

(c) In running at 80 km/h, the fuel efficiency deterioration ratio reduced by changing the system A to the system C in the experiments are 6.8% and 8.3%, and improvement of fuel efficiency of around 7 through 8% has been confirmed.

Next, advantages by the embodiment will be explained.

According to the vehicular air conditioning control apparatus of the embodiment, effects enumerated below can be achieved.

(1) At step S1 of FIG. 4, when it is determined that the magnitude of the temperature difference of ΔT between the evaporator outer temperature Tint and the target evaporator outer temperature T'int becomes equal to or higher than 4° C., there is constituted the flow proceeding from step S1 through step S7 by way of steps S2 and S6, cool down control is carried out by selecting the idling/cool down control map for increasing the duty ratio for the fan motor 10 at a region of the compressor discharge side pressure Pd lower than that of the normal control map and therefore, in cool down, while ensuring the requested cooling performance, improvement of fuel efficiency can be achieved.

(2) The requested cooling performance is predicted by the evaporator outlet temperature sensor 18 for detecting the evaporator outlet temperature Tint directly at the outlet of the evaporator 7 included in the air conditioning cycle, the ECV control portion 22 for setting the target evaporator outlet temperature T'int directly at the outlet of the evaporator 7 included in the air conditioning cycle and the magnitude of the temperature difference ΔT between the evaporator outlet temperature Tint and the target evaporator outlet temperature T'int and therefore, by only detecting the evaporator outlet temperature Tint, the magnitude of the requested cooling performance (magnitude of temperature difference ΔT) can be predicted easily and accurately by utilizing the target evaporator outlet temperature T'int calculated at the ECV control portion 22.

(3) At step S3, when it is determined that the vehicle speed V is slower than 35 km/h, there is constituted the flow proceeding from step S3 through step 7 by way of steps S4 and S6, and idling control is carried out by selecting the idling/cool down control map for increasing the duty ratio for the fan motor 10 at a region of the compressor discharge side pressure Pd lower than the normal control map and therefore, in idling, while ensuring the requested cooling performance, improvement of fuel efficiency can be achieved.

(4) By providing the vehicle speed sensor 19 for detecting the vehicle speed V and detecting that the vehicle is brought into the idling state when the detected value of the vehicle speed is equal to or slower than 35 km/h on the low speed side and therefore, the idling state can easily be detected by utilizing the vehicle speed sensor 19 used in other vehicle-mounted control system and including an extremely low speed region by which cooling of the condenser 4 by running wind is not achieved.

(5) At step S1 of FIG. 4, when it is determined that the magnitude of the temperature difference ΔT between the evaporator outlet temperature Tint and the target evaporator outlet temperature T'int becomes equal to or higher than 4° C., or at step S3, when it is determined that the vehicle speed V is slower than 35 km/h, in either case, the operation proceeds to step S6 to carry out idling/cool down control by selecting the idling/cool down control map for increasing the duty ratio for the fan motor 10 at the region of the compressor discharge side pressure Pd lower than the normal control map and therefore, in either of vehicle states in cool down and in idling, while ensuring the requested cooling performance, improvement of fuel efficiency can be achieved.

(6) As the control map for determining the duty ratio for the fan motor 10 in contrast to the compressor discharge side pressure Pd, there are provided the normal control map which is configured based on the highest efficiency point having the maximum fuel efficiency in a normal running state and the idling/cool down control map which is configured based on the highest efficiency point having the maximum fuel efficiency in the idling state and the cool down state, in running the vehicle which is not brought into a cool down state or in an idling state, the normal control map is selected, in cool down or in idling of the vehicle, the idling/cool down control map is selected and therefore, irrespective of normal running or idling/cool down, good improvement of fuel efficiency can be achieved.

(7) As the compressor of the air conditioning system, the external control type compressor 3 the compressor discharge capacity of which is variably controlled from outside is used, the external control type compressor 3 carries out the control of providing the target compressor discharge capacity determined by the ECV control portion 22 in accordance with the cooling performance requested for the air conditioning cycle and therefore, regardless of the vehicle state, optimization (power saving/fuel efficiency saving) of the compressor discharge side pressure Pd is achieved and by using both of the capacity variable control of the external control type compressor 3 and the PWM control of fan motor 10, high efficiency fuel efficiency improving control minimizing the total engine load or the total battery load by the total sum of the compressor power load (or compressor motor electric load) and the fan motor electric load can be achieved.

Although an explanation has been given of the vehicular air conditioning control apparatus of the invention based on the embodiment as described above, the specific constitution is not limited to that of the embodiment but change or addition of design or the like is permitted so far as the gist of the invention according to respective claims of the scope of claims is not deviated.

For example, although according to the embodiment, an example of using the external control type compressor driven by the engine is shown as the compressor, the invention is applicable to a fixed capacity type compressor controlled to ON/OFF in accordance with operation or non-operation of an air conditioner and to an electric compressor rotational number of which is controlled by an electric motor.

Although according to the embodiment, an example of controlling the fan motor of the electric cooling fan steplessly by PWM control is shown, the invention is applicable to a fan motor controlled by ON/OFF control (variable in 2 stages). Or, the invention is applicable to a fan motor controlled by providing a plurality of control characteristic lines (map).

Although according to the embodiment, an example of predicting the requested cooling performance by the temperature difference between the actual value and the target value of the evaporator outlet temperature as the requested cooling performance predicting section, for example, the requested cooling performance may be predicted by operation of making the air conditioner switch ON, operation of lowering set temperature by the temperature control dial, rapid rise of temperature at inside of the vehicular compartment although the air conditioner is made ON or the like.

According to the embodiment, an example of the high pressure sensor is shown as means for detecting the equivalent value of the compressor discharge capacity. However, for example, means for detecting pressure of the refrigerant at high pressure at any position in the air conditioning cycle from the delivery side of the compressor to the expansion valve, and means for predicting the compressor discharge side pressure by calculation or the like may be used for means for detecting the equivalent value of the compressor discharge capacity.

According to the embodiment, an example of controlling the fan motor by the single idling/cool down control map is shown as the first fan motor controlling section regardless of the requested cooling performance in cool down. However, there may be carried out by a fan motor control in accordance with the magnitude of the requested cooling performance to carry out a correction such that the larger the requested cooling performance, the more increased is the inclination of the idling/cool down control map, to shift the idling/cool down control map to a low side of the compressor discharge side pressure, or to select an optimum map from a plurality of control maps.

According to the embodiment, an example of using the evaporator outlet temperature sensor is shown as the evaporator outlet temperature detecting section. However, when an evaporator inlet temperature sensor is provided, the evaporator outlet temperature may be predicted from the evaporator inlet temperature.

According to the embodiment, an example of using the vehicle speed sensor is shown as idling state detecting section. However, the idling state may be detected by an idling switch, or an engine rotational number sensor.

According to the embodiment, an example of controlling the fan motor by the single idling/cool down control map in idling is shown as the second fan motor controlling section. However, there may be carried out by a fan motor control in accordance with the idling state to carry out a correction in which the lower the vehicle speed or the engine rotational number, the more increased is the inclination of the idling/cool down control map, to shift the idling/cool down control map to the low side of the compressor discharge side pressure, or to select an optimum map from a plurality of control maps.

In the embodiment, as the third fan motor controlling section, the fan motor control in accordance with the magnitude of the requested cooling performance may be carried out as described above when in cool down. Further, when in idling, a fan motor control in accordance with the idling state may be carried out. Furthermore, when in normal running, there may be carried out a fan motor control in accordance with the magnitude of the vehicle speed to carry out a correction of changing the inclination of the normal control map by the magnitude of the vehicle speed, to select an optimum map from a plurality of normal control maps or the like. Also, when in normal running, the fan motor control may be carried out by adding running resistance information of road inclination or the like or accelerator opening degree information or the like other than the vehicle speed information.

Although the present invention has been shown and described with reference to specific embodiments, various changes and modifications will be apparent to those skilled in the art from the teachings herein. Such changes and modifications as are obvious are deemed to come within the spirit, scope and contemplation of the invention as defined in the appended claims.

What is claimed is:

1. A vehicular air conditioning control apparatus comprising:
   a compressor included in an air conditioning cycle and driven by an engine or a motor when operating an air conditioner;
   an electric cooling fan which includes a fan motor operated by a power source by an alternator driven by the engine or a battery, and in which a condenser cooling performance thereof by the fan motor is variably controlled externally;
   a requested cooling performance predicting section adopted to predict a cooling performance requested in the air conditioning cycle;
   a compressor discharge capacity equivalent value detecting section adopted to detect an equivalent value of a compressor discharge capacity of the compressor; and
   a first fan motor controlling section adopted to carry out a control of increasing a fan motor load at a compressor discharge capacity region lower than in a normal control when the requested cooling performance is predicted to be increased by the requested cooling performance predicting section.

2. The apparatus as claimed in claim 1, further comprising:
   an evaporator outlet temperature detecting section adopted to detect a temperature directly at an outlet of an evaporator included in the air conditioning cycle; and
   a target evaporator outlet temperature setting section adopted to set a target temperature directly at the outlet of the evaporator included in the air conditioning cycle,
   wherein the requested cooling performance predicting section predicts the requested cooling performance by a magnitude of a temperature difference between a temperature detected by the evaporator outlet temperature detecting section and a target temperature set by the target evaporator outlet temperature setting section.

3. The apparatus as claimed in claim 2, further comprising:
   a compressor controlling section adopted to carry out a control of providing a target compressor discharge capacity determined in accordance with the cooling performance requested in the air conditioning cycle,
   wherein the compressor is an external control type compressor in which the compressor discharge capacity is variably controlled externally, and is controlled by the compressor controlling section.

4. The apparatus as claimed in claim 1, further comprising:
   a compressor controlling section adopted to carry out a control of providing a target compressor discharge capacity determined in accordance with the cooling performance requested in the air conditioning cycle,
   wherein the compressor is an external control type compressor in which the compressor discharge capacity is variably controlled externally, and is controlled by the compressor controlling section.

5. A vehicular air conditioning control apparatus comprising:
   a compressor included in an air conditioning cycle and driven by an engine or a motor in operating an air conditioner;
   an electric cooling fan which includes a fan motor operated by a power source by an alternator driven by the engine or a battery, and in which a condenser cooling performance thereof by the fan motor is variably controlled externally;
   an idling state detecting section adopted to detect that a vehicle is brought into an idling state;
   a compressor discharge capacity equivalent value detecting section for detecting an equivalent value of a compressor discharge capacity of the compressor; and
   a second fan motor controlling section adopted to carry out a control of increasing a fan motor load at a compressor discharge capacity region lower than in a normal control when the idling state is detected by the idling state detecting section.

6. The apparatus as claimed in claim 5, further comprising:
   a vehicle speed detecting section adopted to detect a vehicle speed, wherein the idling state detecting section detects that the vehicle is brought into the idling state when the vehicle speed detected by the vehicle speed detecting section is equal to or slower than a predetermined vehicle speed.

7. The apparatus as claimed in claim 6, further comprising:
a compressor controlling section adopted to carry out a control of providing a target compressor discharge capacity determined in accordance with the cooling performance requested in the air conditioning cycle,
wherein the compressor is an external control type compressor in which the compressor discharge capacity is variably controlled externally, and is controlled by the compressor controlling section.

8. The apparatus as claimed in claim 5, further comprising:
a compressor controlling section adopted to carry out a control of providing a target compressor discharge capacity determined in accordance with the cooling performance requested in the air conditioning cycle,
wherein the compressor is an external control type compressor in which the compressor discharge capacity is variably controlled externally, and is controlled by the compressor controlling section.

9. A vehicular air conditioning control apparatus comprising:
a compressor included in an air conditioning cycle and driven by an engine or a motor in operating an air conditioner;
an electric cooling fan which includes a fan motor operated by a power source by an alternator driven by the engine or a battery, and in which a condenser cooling performance thereof by the fan motor is variably controlled externally;
a requested cooling performance predicting section adopted to predict a cooling performance requested in the air conditioning cycle;
an idling state detecting section adopted to detect that a vehicle is brought into an idling state; and
a third fan motor controlling section adopted to carry out a control of increasing a fan motor load at a compressor discharge capacity region lower than in a normal control in cool down in which the requested cooling performance is predicted to increase to be equal to or more than a predetermined value by the requested cooling performance predicting section or in idling of the vehicle.

10. The apparatus as claimed in claim 9,
wherein the third fan motor controlling section includes a normal control map which is configured based on a maximum efficiency point in which a fuel efficiency is mostly improved in a normal running state, and an idling/cool down control map which is configured based on a highest efficiency point in which the fuel efficiency is mostly improved in the idling state and in a cool down state as a control map for determining a fan motor load with respect to a compressor discharge capacity,
wherein in running the vehicle which is not brought into the cool down state or the idling state, the normal control map is selected and in the cool down state or the idling state of the vehicle, the idling/cool down control map is selected.

11. The apparatus as claimed in claim 10, further comprising:
a compressor controlling section adopted to carry out a control of providing a target compressor discharge capacity determined in accordance with the cooling performance requested in the air conditioning cycle,
wherein the compressor is an external control type compressor in which the compressor discharge capacity is variably controlled externally, and is controlled by the compressor controlling section.

12. The apparatus as claimed in claim 9, further comprising:
a compressor controlling section adopted to carry out a control of providing a target compressor discharge capacity determined in accordance with the cooling performance requested in the air conditioning cycle,
wherein the compressor is an external control type compressor in which the compressor discharge capacity is variably controlled externally, and is controlled by the compressor controlling section.

* * * * *